United States Patent [19]

Beisner et al.

[11] Patent Number: 4,703,897
[45] Date of Patent: Nov. 3, 1987

[54] METHOD AND APPARATUS FOR CONTINUOUS PRESSURE COMMINUTION OF BRITTLE GRINDING STOCK

[75] Inventors: Klaus Beisner, Lohmar; Ludwig Gemmer, Cologne; Raimund Zisselmar, Erftstadt; Hans Kellerwessel, Aachen, all of Fed. Rep. of Germany

[73] Assignee: Klockner-Humboldt-Deutz Aktiengesellschaft, Fed. Rep. of Germany

[21] Appl. No.: 814,539

[22] Filed: Dec. 20, 1985

Related U.S. Application Data

[63] Continuation of Ser. No. 573,340, Jan. 24, 1984, abandoned.

[30] Foreign Application Priority Data

Jan. 24, 1983 [DE] Fed. Rep. of Germany ....... 3302176

[51] Int. Cl.$^4$ ............................ B02L 4/02; B02L 4/30
[52] U.S. Cl. ......................................... 241/24; 241/29; 241/77; 241/79; 241/80; 241/152 A; 241/230
[58] Field of Search ................... 241/3, 24, 29, 34, 36, 241/76, 77, 79, 80, 87, 152 A, 230, 231, 235

[56] References Cited

U.S. PATENT DOCUMENTS

| | | | |
|---|---|---|---|
| 3,190,572 | 6/1965 | Goto | 241/235 |
| 3,261,741 | 7/1966 | Bidwell | 241/235 X |
| 3,402,895 | 9/1968 | Willmann | 241/36 |
| 4,074,866 | 2/1978 | Meder | 241/231 X |
| 4,225,091 | 9/1980 | Steier | 241/34 X |

FOREIGN PATENT DOCUMENTS 3323517 1/1985 Fed. Rep. of Germany ... 241/152 A
3337615 4/1985 Fed. Rep. of Germany ... 241/152 A Primary Examiner—Timothy V. Eley
Attorney, Agent, or Firm—Hill, Van Santen, Steadman & Simpson

[57] ABSTRACT

A method and apparatus for continuous pressure comminution of brittle grinding stock such as cement clinker wherein simultaneous operations of unit grain comminution and product bed comminution are carried out in the roller gap of the same roller machine in such a manner that the grinding stock is first precomminuted by means of the unit grain comminution in a wider roller gap and immediately thereafter, the grinding stock fragments produced in the unit grain comminution are further comminuted by the technique of product bed comminution in the region of the narrowest roller gap. The continuous pressure comminution is characterized by a high pressure of more than 2 metric tons per centimeter of roller length, with a sifter being provided after the pressure roller.

11 Claims, 6 Drawing Figures

METHOD AND APPARATUS FOR CONTINUOUS PRESSURE COMMINUTION OF BRITTLE GRINDING STOCK

This is a continuation of application Ser. No. 573,340, filed Jan. 24, 1984, now abandoned.

BACKGROUND OF THE INVENTION

1. Field of the Invention

This invention is in the field of comminution of brittle products characterized by a relatively low specific energy consumption with a high degree of comminution and a low apparatus outlay. It involves the immediately sequential steps of unit grain comminution followed by a product bed comminution all occurring in the same roller gap of a pressure roller machine.

2. Description of the Prior Art

In pressure comminution of brittle grinding stock in the roller gap of a roller machine, the grinding stock is crushed or comminuted by means of compressive stress. Crackers or roll-jaw crushers are usually operated on the principles of unit grain comminution. The feed is uniformly distributed over the width of the roller and is supplied to the rollers in such slight amounts that the particles of the feed do not crush each other in the roller gap. Cracking or crushing between the rollers is carried out, in effect, grain to grain. This operating mode is standard when as small as possible a proportion of superfine material is desired in the product, i.e., there must be a tight grain size distribution or a "steep" cumulative size distribution curve. With plain roller machines, the degree of comminution is limited to about 1:4 ("Ullmanns Encyklopädie der technischen Chemie", Fourth Edition 1972, Volume 2, page 12, left-hand column).

It is also known to operate roller mills according to the principle of product bed comminution. In this type of comminution, the feed is supplied to the roller gap in such a large quantity that the product to be comminuted is drawn in between the rollers and presses the rollers apart, so that the particles of the feed mutually crush one another in the roller gap to produce an agglomerated product bed. A gap width of the rollers resiliently pressed against each other greater than the particle size of the feed is maintained. This operating mode of product bed comminution in roller mills is often referred to in English as "choke feeding" (see, for example, "Handbook of Mineral Dressing" by Taggart, New York, January 1948, page 4–57, paragraph 4).

The distinction between unit or individual grain crushing and product bed crushing is also discussed in German OS No. 1 757 093 which serves to explain the state of the art.

When a high degree of comminution or high fineness of the grinding stock are to be achieved, multi-stage grinding methods such as pre-comminution, mean comminution and fine comminution have been employed. An attempt was made to match the stress conditions in each of the stages or in the comminution machines to the size of the grinding stock particles to be comminuted in order to reduce the energy consumption of the overall process. The multi-stage grinding methods with comminution machines connected in series, however, produce a high overall specific energy consumption as well as high overall capital costs. Ball mills are distinguished by a high degree of comminution and can grind chunks of cement clinker to cement fineness but the specific energy of the ball mills, however, is high.

SUMMARY OF THE INVENTION

The present invention provides a comminution method and apparatus by means of which a brittle product can be comminuted or crushed to a high degree of comminution which is nonetheless distinguished by a relatively low specific energy consumption and by a low apparatus outlay.

In the method of the present invention, the principle of unit grain comminution and the principle of product bed comminution are realized in immediate succession in one and the same roller machine for the grinding stock. With the inventive method, cement clinker having a grain size of 100 mm can be ground in a single stage into cement having a grain size far below 1 mm. A range of mean comminution extending from about 100 mm to 3 mm and at least a part of the fine comminution wherein the grinding fineness is essentially finer than 1 mm are realized in a single machine, i.e., the comminution degree is unusually high for a roller machine. In the method of the invention, the pre-comminution machine otherwise required and at least a part of its energy consumption are eliminated. In addition, the individual grains are destroyed in the unit grain comminution and the grinding stock fragments thereby arising are largely cracked and suffer damage to their crystal lattice. Since in the present invention the grinding stock fragments which arise in the unit grain comminution are immediately supplied to the product bed comminution step as soon as they have arisen, the injuries and disruptions of the crystal lattices of the fragments do not have time to cure. This is in contrast to a two-stage or multi-stage comminution method where the pre-comminution and the fine comminution are executed in separate machines as when a product bed comminution roller machine is preceded by its own precomminution machine. In the method of the invention, the grain injuries and the lattice disruptions of the grinding stock fragments obtained from the unit grain comminution do not recover before the following grain stressing, so that the energy to be exerted in the region of the narrowest roller gap for the further comminution of the fragments and thus the overall energy consumption of the improved comminution method are very low in comparison.

One of the features of the present invention utilizing combined unit grain and product bed comminution is that the grain size of a significant part (10% or more) of the grinding stock to be supplied to the roller gap is greater than the width of the roller gap.

Broadly speaking, therefore, the method of the present invention involves introducing the brittle grinding stock above the nip of a pair of rotating pressure rollers, the stock having a substantial proportion of particles whose grain size exceeds the minimum width of the nip, to thereby comminute the stock into grains having a particle size less than the minimum width, with the amount of stock being fed to the rollers and the pressure applied thereto at the nip being sufficient to force the rollers apart and cause the particles entering the nip to mutually crush one another and produce an agglomerate.

In a preferred embodiment of the invention, the pressure force of the rollers acting on the grinding stock amounts to more than 2 metric tons per centimeter of roller length. The pressing force is thus very high in order to effect as thorough a destruction of the particles as possible. When sufficiently high pressure forces are applied in the product bed comminution stage, an agglomeration of the comminuted particles occurs. Some substances have a pronounced tendency toward agglomeration, particularly those having a cubic, face-centered lattice such as rock salt, sylvine, or limestone. Other substances, for example, quartz, evidence little agglomeration. The fact that agglomeration of the comminuted particles can occur with the application of very high pressure forces is known, per se, from SU-LP No. 490 498. This patent proposes a compression of the product to be comminuted under hydrostatic pressure whereby the crushing strength of the material to be comminuted is exceeded by 20 to 30% with the intentional formation of agglomerates which are then disintegrated in a second stage. Insofar as agglomeration of the comminuted particles occurs in the method of the present invention with its high pressures in the roller nip, these agglomerates can be disintegrated in a suitable device following the roller machine such as in a tube mill, a ball mill, a distributing plate air separator, or a sizing jig. Only a slight energy expenditure is required for the disintegration of product agglomerates that may be formed.

The apparatus for carrying out the present invention may include a roller machine operated with a very high pressure of more than 2 metric tons/cm roller length, the roller machine preferably being combined with a sizing jig and followed by at least one sifter or grinder unit such as a bucket elevator circulating grinding unit having a tube mill and a sifter.

BRIEF DESCRIPTION OF THE DRAWINGS

The invention and further features and advantages thereof are explained in greater detail with reference to the embodiments schematically shown in the drawings, in which:

Referring to FIG. 1, when material is pressed in a gap between two rollers, a pressure build-up begins starting at a level which is defined by half the entering angle $\alpha$, the pressure build-up leading to an opposing force that attempts to force the rollers apart against the mechanical or hydraulic bias which is normally provided for the rollers. This opposing force is easily measured or can be derived from measured values. In the case of a hydraulic spring, the opposing force is $F = p_{hydr.} \times A$, where $P_{hydr.}$ is the pressure in the hydraulic system which can be measured with a manometer and A is the piston area or the sum of the piston areas depending on the conditions.

Figure 1:
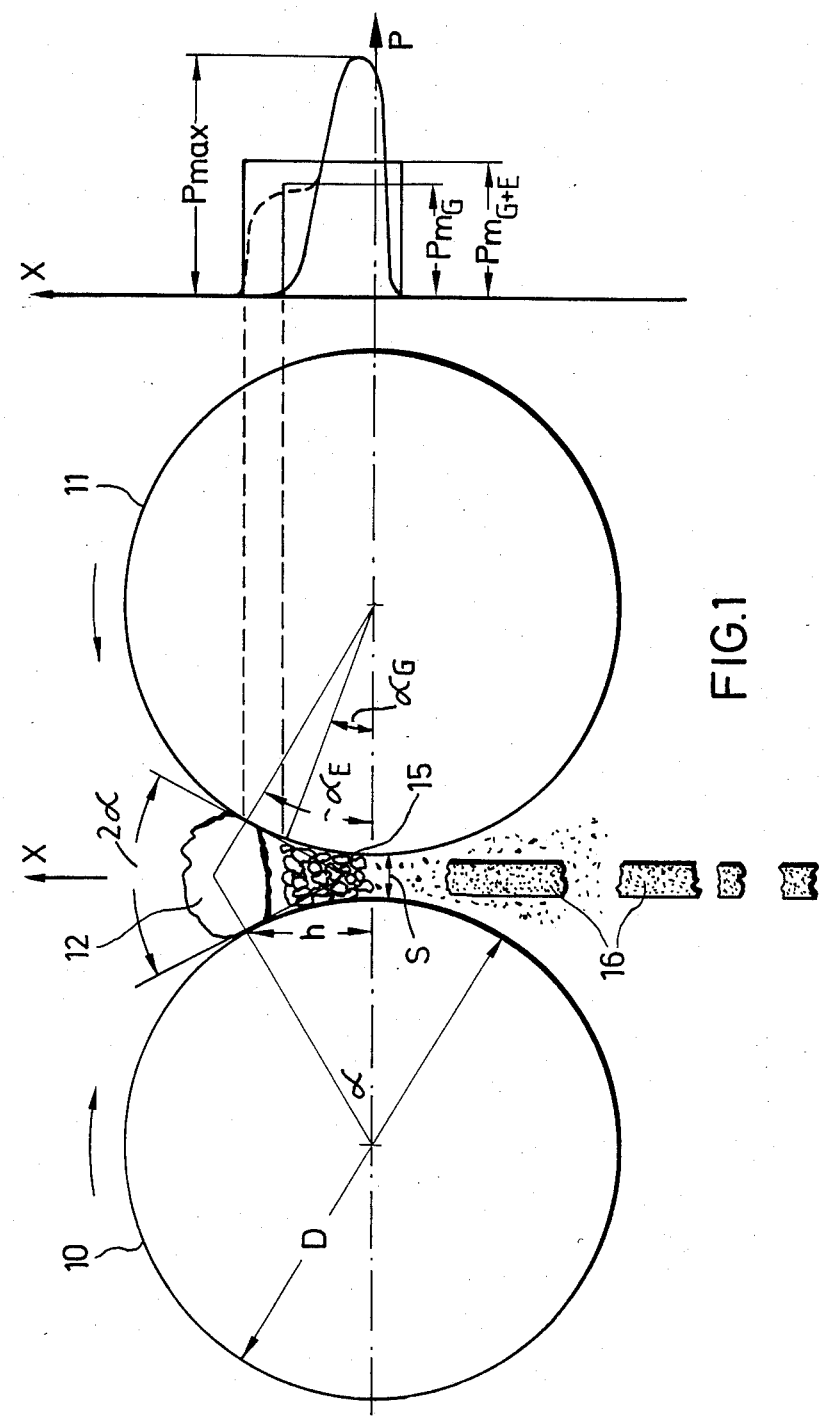
FIG. 1 is a schematic representation showing a combined unit grain comminution and product bed comminution in the gap of a roller type crusher, together with a pressure diagram.

A non-precomminuted cement clinker chunk 12 is shown in FIG. 1 between rollers 10 and 11 of a roller machine. The qualitative pressure curve in the roller gap is shown at the right of FIG. 1. Defined by the intersection of half the entering angle $\alpha$ with the tangential line of the roller, the pressure p steadily increases from the level $x = h$ up to a level just above the plane of the roller shafts and then rapidly decreases to zero. The maximum pressure of the pressure diagram has been identified at $p_{max}$, whereas the mean pressure of the product bed comminution, i.e., without a preceding unit grain comminution is identified as $p_{mG}$ and the mean pressure of the product bed comminution including the unit grain comminution in the same roller gap is specified as $p_{mG+E}$. The pressure diagram has not been capable of quantitative identification until now. The pressure distributions can be different with the same applied force. Different values can thus be obtained both for the mean pressure and the roller gap as well as for the maximum pressure in proximity to the narrowest width of the roller gap.

Tests made with a roller machine of this type that preceded a ball mill for grinding cement clinker showed that for such a machine it was possible (a) to carry out the precomminution of the cement clinker in one working pass and in one machine to finely comminute a significant part of the clinker to a particle size less than 1 mm and at the same time (b) to realize a unit grain comminution and a product comminution in one and the same machine and in one working pass.

The following specific example illustrates the results obtained with the present invention.

A double-roller machine as shown in FIG. 1 had a roller diameter D of 900 mm and a roller width of 250 mm. It was operated with a circumferential roller speed of 0.31 to 0.43 m/sec. According to the flow diagram of FIG. 2, this roller machine 10,11, preceded a bucket elevator circulating grinder unit consisting of a dual-chambered tube mill 13 having a diameter of 2.2 m and a length of 14 m, a cyclone circulating air sifter 14 with bucket units between the double-roller machine and the tube mill as well as between the tube mill and the sifter.

Non-precomminuted cement clinker supplied to the machine 10,11 had the following grain size distribution:

| Grain size mm | Share % of the mass | Cumulative share % of the mass |
|---|---|---|
| >45.0 | 7.7 | 7.7 |
| 45.0–31.5 | 4.5 | 12.2 |
| 31.5–22.4 | 8.3 | 20.5 |
| 22.4–16.0 | 1.5 | 22.0 |
| 16.0–11.2 | 3.8 | 25.8 |
| 11.2–8.0 | 7.5 | 33.3 |
| 8.0–5.6 | 5.9 | 39.2 |
| 5.6–4.0 | 9.4 | 48.6 |
| 4.0–2.8 | 13.4 | 62.0 |
| 2.8–2.0 | 10.9 | 72.9 |
| 2.0–1.0 | 7.6 | 80.5 |
| 1.0–0.5 | 9.9 | 90.4 |
| 0.5–0.315 | 4.3 | 94.7 |
| 0.315–0.25 | 4.1 | 98.8 |
| <0.25 | 1.2 | 100.0 |

The maximum grain size of the feed material was about 100 mm. The fill density was 1,600 kg/m³. The roller pressure during operation amounted to 6.1 to 8.6 t/cm. A detenter or spacer was situated between the pillow blocks of the rollers 10,11, thus limiting the roller gap to a minimum width of 14 mm so that large chunks could still be drawn into the roller gap in the unit grain comminution and the rollers did not strike each other when feed was no longer supplied.

FIG. 1 illustrates how the grinding stock fragments 15 which arose during the unit grain comminution are further comminuted by the product bed comminution in the region of the minimum roller gap. The cement clinker emerged from the roller gap comminuted and partially agglomerated, i.e., compressed into a blind scab 16. The thickness s of the blind scab, i.e., the roller gap width during operation was approximately 20 mm. The density by volume of the scab 16 amounted to 2400 kg/m³.

Referring again to FIG. 1, the largest pieces 12 of the feed are ingested by the rollers 10,11 at an angle $\alpha_E$ of 23° at a height h=180 mm above the plane of the roller axis. The horizontal distance between the circumferential surfaces of the rollers amounts to $s+D(1-\cos\alpha_E)=92$ mm. The feed as a whole is compressed from a density of 1,600 to 2,400 kg/m³, i.e., in the ratio of 1:1.5. This means that the space between the rollers 10,11 is filled with the heaped feed where the horizontal spacing of the circumferential surfaces of the rollers amounts to 31.08 mm. It is at this region that product bed comminution begins, this being the case where angle $\alpha_G=9°$ or h=66 mm above the plane of the roller axes. Whereas only a single entering angle is referred to in the technical literature regarding roller mills, two entering angles are effective for the comminution method of the present invention, namely, one for the unit grain comminution ($\alpha_E$) and one for the product bed comminution ($\alpha_G$). It is evident from the pressure diagram of FIG. 1 that the unit grain comminution is accomplished along with the product bed comminution at substantially no increase in cost and without any significant additional energy expenditure. In the method of the invention, the technologies of a roller mill and of a roller press which normally have contradictory objectives per se are combined with one another, with a surprising result of a great saving of comminution energy that is further explained in a succeeding portion of this description.

After careful disagglomeration, the clinker emerging from the roller machine 10,11, exhibited the following grain size distribution:

| Grain size mm | Share % of the mass | Cumulative share % of the mass |
| --- | --- | --- |
| >16.0 | 6.8 | 6.8 |
| 16.0–8.0 | 9.3 | 16.1 |
| 8.0–4.0 | 20.2 | 36.3 |
| 4.0–2.0 | 18.1 | 54.4 |
| 2.0–1.0 | 12.9 | 67.3 |
| 1.0–0.5 | 9.6 | 76.9 |
| 0.5–0.25 | 7.3 | 84.2 |
| 0.25–0.125 | 5.6 | 89.8 |
| 0.125–0.09 | 2.5 | 92.3 |
| 0.09–0.063 | 2.2 | 94.5 |
| <0.063 | 5.5 | 100.0 |

Figure 2:
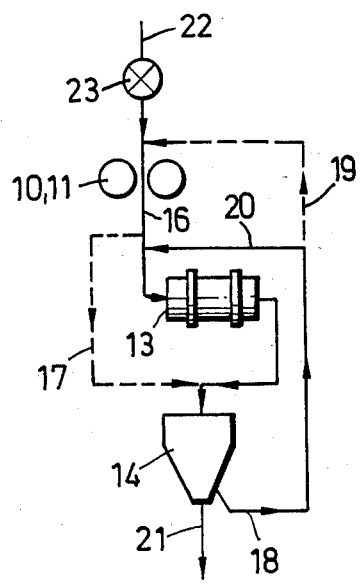
FIGS. 2 to 6, inclusive, are schematic representations of various embodiments of the improved comminution method of the present invention which can be employed.

Under the aforementioned conditions, the cement clinker grinding installation of FIG. 2 including all conveyor means and including a double-roller machine 10,11 used 35.6 kWh of electrical energy per ton of clinker. It produced 21 metric tons of cement per hour with a fineness of 2825 cm²/g measured according to Blaine. Without the preceding double-roller machine 10,11 the grinding system was only capable of producing 15 t/h of cement having the same fineness and it thereby consumed 45.9 kWh/t. This means that the use of the double-roller machine 10,11 produced a 40% increase in the throughput rate with a simultaneous reduction of the specific energy requirement by 22%.

The surfaces of the rollers 10,11 of the roller machine can be smooth but in order to improve the entering conditions in the roller gap, projecting profiles such as welding beads in the form of a V can be applied to the smooth roller surface under some conditions. The resulting pressed scabs are thereby simultaneously provided with inherent break points. The rollers can be composed of segments and may include end plates. Grinding expedients can be added in order to facilitate the disagglomeration of the agglomerates leaving the double-roller machine 10,11.

In the flow diagram of FIG. 2, there is a provision that at least a part of the product leaving the roller machine 10,11 and containing agglomerates is directly supplied to the sifter 14 by means of a conduit 17 while bypassing the tube mill 13, the coarse fraction being delivered by a conduit 18 and a conduit 19 to the roller machine 10,11, and/or over the conduit 20 to the tube mill 13 for grinding down to final fineness. The cement ground to suitable fineness leaves the sifter 14 through conduit 21. In order to match the output of the roller machine 10,11, to the output of the grinding system, a control operation on the fresh feed entering through the conduit 22 is performed as a function of the quantity of coarse materials leaving through conduit 18 and returned to the sifter 14 for comminution. The feed in the conduit 22 can be controlled by means of a control apparatus 23 which may be an adjustable flap, a vibrating channel, a stuffing screw or the like. The amount of coarse particles in the conduit 18 may also be used as a variable for controlling the roller speed of the machine.

Figure 3:
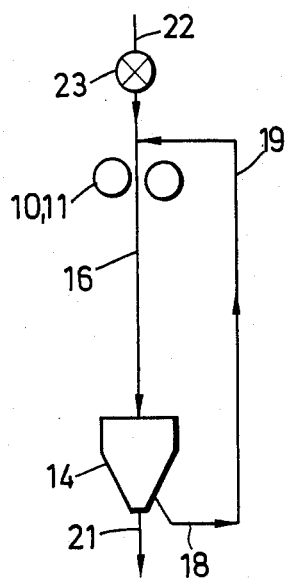

In the form of the invention shown in FIG. 3, the overall quantity of product leaves by means of conduit 16 and is supplied to a sifter 14. The coarse fraction is removed by means of conduit 18 and returned over conduit 19 to the roller machine.

Figure 4:
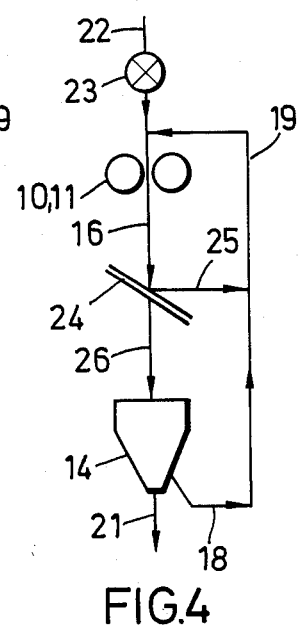

In the example shown in FIG. 4, a sizing jig 24 is interposed between the roller machine 10, 11 and the sifter 14, the sizing jig grading the coarse fraction from the agglomerate containing product and delivering it by means of conduit 25 back into the roller machine 10, 11 in order to relieve the sifter 14. The fine fraction passes by means of a conduit 26 from the jig 24 to the sifter 14.

Figure 5:
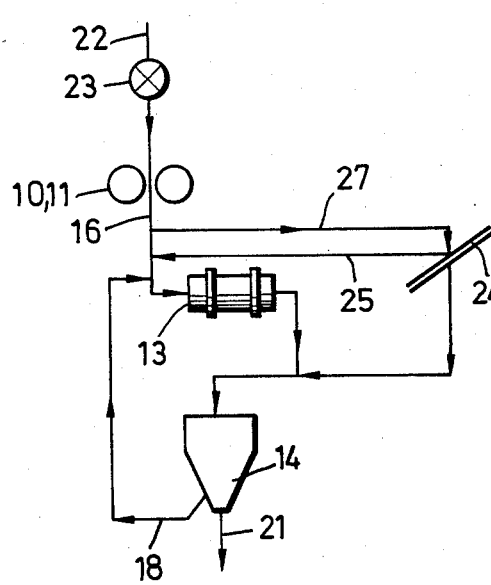

In the form of the invention shown in FIG. 5, the agglomerate containing product is removed through conduit 16 and is partially conveyed to the tube mill 13 and another portion is conveyed by means of conduit 27 to a screen 24. The coarse fraction passes through a conduit 18 of the sifter 14 and a coarse fraction from the screen 24 passes by means of a conduit 25 to the tube mill 13.

Figure 6:
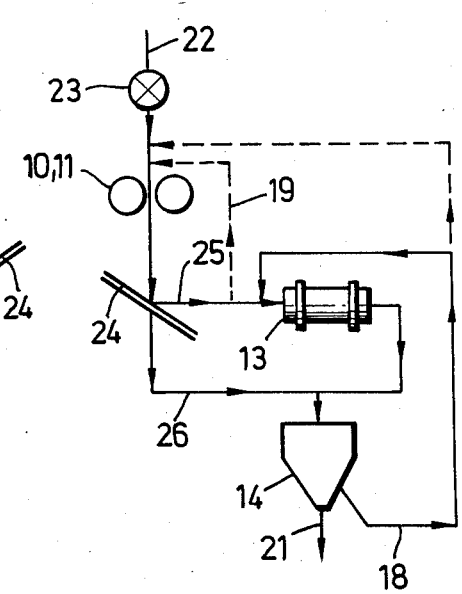

In FIG. 6 the coarse fraction leaves by a conduit 25 from the screen 24 and can be returned to the tube mill 13 instead of to the roller machine 10,11 by means of the conduit 19 and the coarse fraction in conduit 18 of the sifter 14 can be returned to the tube mill 13 instead of to the roller machine 10, 11. The tube mill 13 can be a ball mill having only a single grinding chamber or it can have a grinding chamber in which grinding is autogeneously carried out under given conditions. In any case, the ball make-up of the ball mill is matched to the altered mill feed of the cement clinker scabs. A hobbing mill, vibration grinding mill or other suitable mill can be provided instead of the tube mill 13.

In the preferred form of the invention, the diameter of each roller exceeds 750 mm, and is preferably more than 900 mm. The stock has a grain size of up to about 100 mm, half the entering angle, $\alpha_E$, of the unit grain comminution is in the range of 10° through 30°, and half the entering angle, $\alpha_G$, of the product bed comminution is in the range of 3° through 15°.

It will be evident that various modifications can be made to the described embodiments without departing from the scope of the present invention.

I claim as my invention:

1. A method for the continuous pressure comminution of brittle grinding stock such as cement clinker which comprises:
   providing a roll-jaw crusher consisting of a pair of driven rollers having a varying width nip therebetween with the rollers having a diameter greater than 750 mm,
   delivering to the nip a grinding stock in which a substantial portion thereof has a grain size larger than the width of said nip,
   applying a force to said rollers obtaining a crushing force in the nip in excess of 2 tons per centimeter of roll length, and
   simultaneously subjecting said stock to unit grain comminution in that portion of the nip which is relatively wide and to product bed comminution where said nip has its smallest width.

2. A method according to claim 1 which includes sifting the material leaving said roll-jaw crusher into a finely divided finished product and a coarse fraction, and recycling said coarse fraction back to said roll-jaw crusher for additional comminution.

3. A method according to claim 2 which comprises:
   regulating the quantity of fresh stock supplied to said roll-jaw crusher in relation to the amount of said coarse fraction recycled to said roll-jaw crusher.

4. A method according to claim 2 which comprises:
   regulating the speed of said driven rollers in relation to the amount of said coarse fraction recycled to said roll-jaw crusher.

5. A method for the continuous pressure comminution of brittle grinding stock in accordance with the steps of claim 1, including driving the rolls at a circumferential speed in the range of 0.31 to 0.43 meters per second.

6. A method according to claim 1 wherein the grain size of said stock is up to about 100 mm, the half nip angle of the unit grain communition region defined by the angle between the roller axis and the portion of the stock at which unit grain comminution begins is in the range from 10° to 30°, and the half nip angle of the product bed comminution defined by the angle between the roller axis and the portion of the stock at which product bed comminution begins is in the range of 3° to 15°.

7. A method according to claim 1 wherein the spacing between between the rollers is at least 14 mm.

8. A mechanism for the continuous pressure comminution of brittle grinding stock, which comprises in combination:
   a roll jaw crusher including a pair of driven rollers having a varying nip width therebetween with the rollers having a diameter greater than 750 mm,
   means for delivering to the nip a grinding stock in which a substantial portion thereof has a grain size larger than the width of the nip,
   means applying a force to said rollers obtaining a crushing force in the nip in excess of 2 tons per centimeter of roll length, and
   the diameters of the rolls, the spacing of the rolls, and the speed of the rolls being such that said stock entering the nip is subjected to unit grain comminution in that portion of the nip which is relatively wide and to product bed comminution where the nip has its smallest width.

9. A mechanism for the continuous pressure comminution of brittle grinding stock, which comprises in combination:
   a roll jaw crusher including a pair of driven rollers having a varying nip width therebetween with the rollers having a diameter greater than 750 mm,
   means for delivering to the nip a grinding stock in which a substantial portion thereof has a grain size larger than the width of the nip,
   means applying a force to said rollers obtaining a crushing force in the nip in excess of 2 tons per centimeter of roll length,
   the diameters of the rolls, the spacing of the rolls, and the speed of the rolls being such that said stock entering the nip is subjected to unit grain comminution in that portion of the nip which is relatively wide and to product bed comminution where the nip has its smallest width,
   a tube mill connected to receive delivery of comminuted stock for the roll jaw crusher,
   a sifter connected to receive delivery from the tube mill to produce a coarse fraction and a fine fraction, and
   a return line leading from the sifter delivering the coarse fraction to the roll jaw crusher for reprocessing.

10. A mechanism for the continuous pressure comminution of brittle grinding stock, which comprises in combination:
    a roll jaw crusher including a pair of driven rollers having a varying nip width therebetween with the rollers having a diameter greater than 750 mm,
    means for delivering to the nip a grinding stock in which a substantial portion thereof has a grain size larger than the width of the nip,
    means applying a force to said rollers obtaining a crushing force in the nip in excess of 2 tons per centimeter of roll length,
    the diameters of the rolls, the spacing of the rolls, and the speed of the rolls being such that stock entering the nip is subjected to unit grain comminution in that portion of the nip which is relatively wide and to product bed comminution where the nip has its smallest width,
    a tube mill connected to receive delivery of comminuted stock from the roll jaw crusher,
    a sifter connected to receive delivery from the tube mill, said sifter producing a fine fraction and a coarse fraction, and
    a return line connected from the sifter to an intake for the tube mill for returning coarse fraction material to be reprocessed by the tube mill.

11. A mechanism for the continuous pressure comminution of brittle stock, which comprises in combination:
    a roll jaw crusher including a pair of driven rollers having a varying nip width therebetween with the rollers having a diameter greater than 750 mm,
    means for delivering to the nip a grinding stock in which a substantial portion thereof has a grain size larger than the width of the nip,
    means supplying a force to said rollers obtaining a crushing force in the nip in excess of 2 tons per centimeter of roll length,
    the diameters of the rolls, the spacing of the rolls, and the speed of the rolls being such that said stock entering the nip is subjected to unit grain comminution in that portion of the nip which is relatively wide and to product bed comminution where the nip has its smallest width,
    a sifter connected to receive the delivery from the roll jaw crusher, such sifter producing a fine fraction and a coarse fraction, and
    a conduit leading from the discharge of the sifter back to an intake for the roll jaw crusher for delivering coarse fraction material for reprocessing by the roll jaw crusher.

* * * * *